US012654704B2

(12) United States Patent
Suzuki et al.

(10) Patent No.: US 12,654,704 B2
(45) Date of Patent: Jun. 16, 2026

(54) DRIVING ASSISTANCE DEVICE

(71) Applicant: AISIN CORPORATION, Kariya (JP)

(72) Inventors: Takanori Suzuki, Kariya (JP); Kota Ishikawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 47 days.

(21) Appl. No.: 18/763,494

(22) Filed: Jul. 3, 2024

(65) Prior Publication Data

US 2025/0026348 A1 Jan. 23, 2025

(30) Foreign Application Priority Data

Jul. 18, 2023 (JP) ................................. 2023-116877

(51) Int. Cl.
B60W 30/18 (2012.01)
G06V 20/56 (2022.01)

(52) U.S. Cl.
CPC ....... B60W 30/18027 (2013.01); G06V 20/56 (2022.01); *B60W 2510/20* (2013.01); *B60W 2720/106* (2013.01)

(58) Field of Classification Search
CPC .... B60W 30/06; B60W 30/146; B60W 30/18; B60W 30/18027; B60W 40/107; B60W 2540/10; B60W 2520/10; B60W 2720/10; B60W 2720/106; B60W 50/10; B60W 2510/20; B60K 28/00; B60K 2031/0091; G06V 20/18027; G01S 13/88; G01S 13/931
USPC ...................................................... 701/70–92
See application file for complete search history.

(56) References Cited

U.S. PATENT DOCUMENTS

| | | | | | |
|---|---|---|---|---|---|
| 2004/0257244 | A1* | 12/2004 | Kubota | .............. | B62D 15/0285 |
| | | | | | 340/932.2 |
| 2009/0123028 | A1* | 5/2009 | Satonaka | ............. | G06V 20/586 |
| | | | | | 382/106 |
| 2015/0321667 | A1* | 11/2015 | Fukata | ................... | B60K 28/00 |
| | | | | | 701/70 |
| 2020/0064464 | A1* | 2/2020 | Hiromitsu | ......... | B60W 30/0953 |
| 2021/0001837 | A1* | 1/2021 | Hirakawa | ............. | B60W 30/06 |
| 2021/0094577 | A1* | 4/2021 | Shalev-Shwartz | ... | G05D 1/0231 |
| 2021/0213941 | A1 | 7/2021 | Fukasawa et al. | | |
| 2023/0373524 | A1* | 11/2023 | Morita | ................... | G01S 13/44 |
| 2024/0383469 | A1* | 11/2024 | Kiyokawa | ............. | B60W 60/00 |

FOREIGN PATENT DOCUMENTS

| | | |
|---|---|---|
| JP | 5257647 B2 | 8/2013 |
| WO | 2020/066331 A1 | 4/2020 |

* cited by examiner

*Primary Examiner* — Hai H Huynh
*Assistant Examiner* — Johnny H Hoang
(74) *Attorney, Agent, or Firm* — Sughrue Mion, PLLC

(57) ABSTRACT

A driving assistance device performs driving assistance of a vehicle on a basis of surrounding information collected by a plurality of sensors provided in the vehicle. The driving assistance device includes: a route calculation unit configured to calculate a movement route of the vehicle to a target position on a basis of the surrounding information from the plurality of sensors; a movement control unit configured to move the vehicle along the movement route at a target speed within a speed limit value according to a current situation of the vehicle; and an acceleration determination unit configured to determine acceleration at which the vehicle reaches the target speed on a basis of a predetermined acceleration time and the speed limit value.

6 Claims, 8 Drawing Sheets

*Fig. 1*

FORWARD MOVEMENT OUTSIDE PARKING SPACE WITHOUT OBSTACLE

BACKWARD MOVEMENT OUTSIDE PARKING SPACE WITHOUT OBSTACLE

DRIVING ASSISTANCE DEVICE

CROSS REFERENCE TO RELATED APPLICATIONS

This application is based on and claims priority under 35 U.S.C. § 119 to Japanese Patent Application No. 2023-116877, filed on Jul. 18, 2023, the entire content of which is incorporated herein by reference.

TECHNICAL FIELD

The present disclosure relates to a driving assistance device.

BACKGROUND DISCUSSION

There is a driving assistance device that performs automatic parking and unparking of a vehicle in and from a parking space. During execution of driving assistance, a speed limit value is set according to a current situation of a vehicle. The driving assistance device accelerates a vehicle at acceleration within a predetermined range to cause a vehicle speed to reach, for example, a set speed limit value, and moves the vehicle to a target position.

For example, in the technique of WO 2020/066331 A, it is possible to stop a vehicle at a target position by setting an acceleration profile, which is a temporal change of a target value of acceleration at the time of deceleration of the vehicle, according to a distance to the target position. In addition, in the technique of JP 5257647 B2, acceleration of a vehicle is limited within upper limit acceleration set according to a vehicle speed, which makes it possible to inhibit the occurrence of an unexpected acceleration state.

However, in the technique of WO 2020/066331 A, a situation may occur in which a vehicle occupant feels sudden acceleration depending on the distance to the target position. In addition, in the technique of JP 5257647 B2, even when the occurrence of an unexpected acceleration state is inhibited and a safe traveling state is maintained, there may be a case where an occupant sensorily feels sudden acceleration.

A need thus exists for a driving assistance device which is not susceptible to the drawback mentioned above.

SUMMARY

A driving assistance device performs driving assistance of a vehicle on a basis of surrounding information collected by a plurality of sensors provided in the vehicle. The driving assistance device includes: a route calculation unit configured to calculate a movement route of the vehicle to a target position on a basis of the surrounding information from the plurality of sensors; a movement control unit configured to move the vehicle along the movement route at a target speed within a speed limit value according to a current situation of the vehicle; and an acceleration determination unit configured to determine acceleration at which the vehicle reaches the target speed on a basis of a predetermined acceleration time and the speed limit value.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a top view of a vehicle on which a driving assistance device according to an embodiment is mounted;

DETAILED DESCRIPTION

Figure 2:
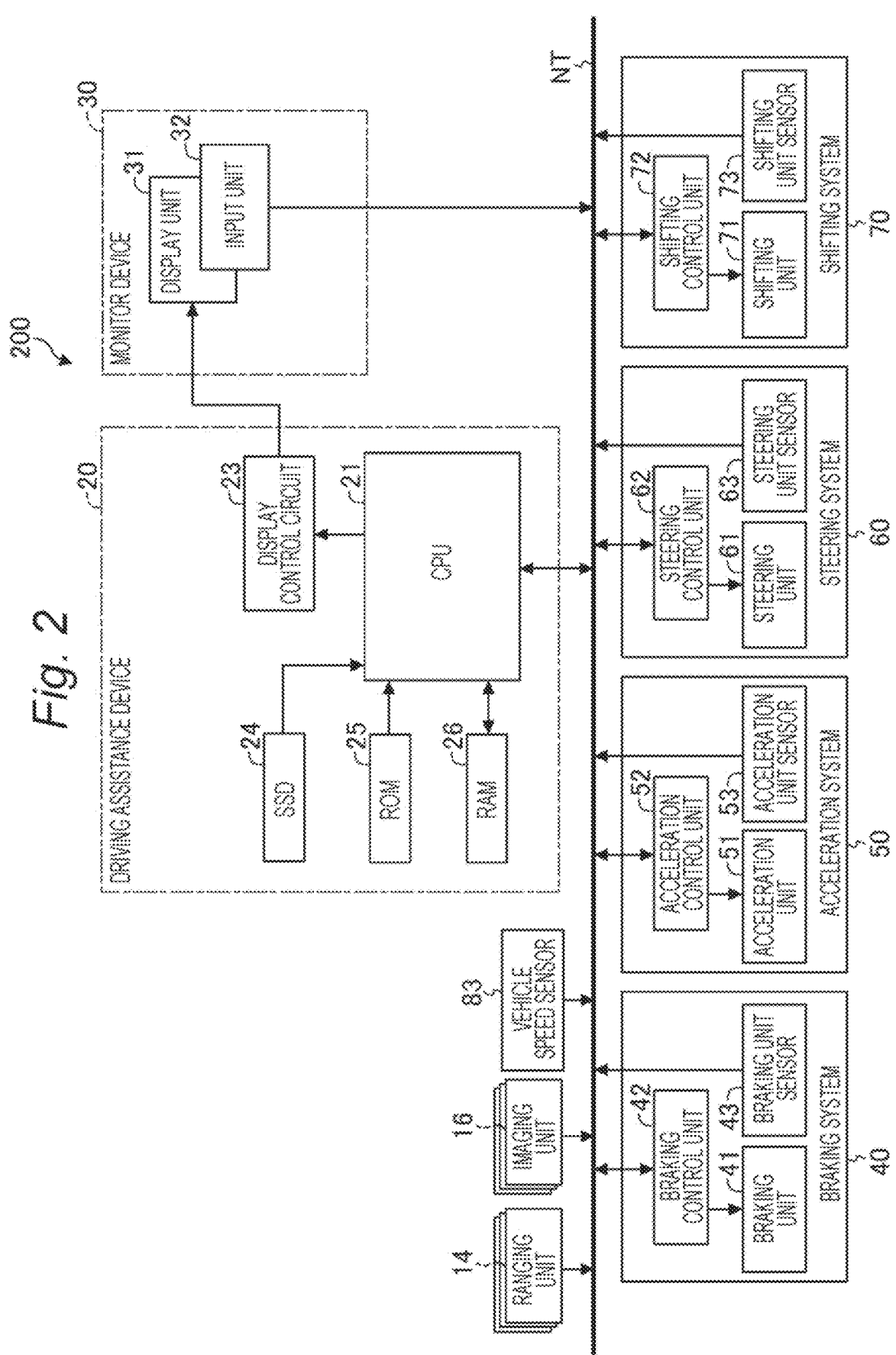
FIG. 2 is a block diagram illustrating an example of an overall configuration of a driving assistance system according to the embodiment.

Like components in the following exemplary embodiment or the like are denoted by common reference numerals, and redundant description will be omitted as appropriate.
(Configuration Example of Vehicle)

Figure 1:
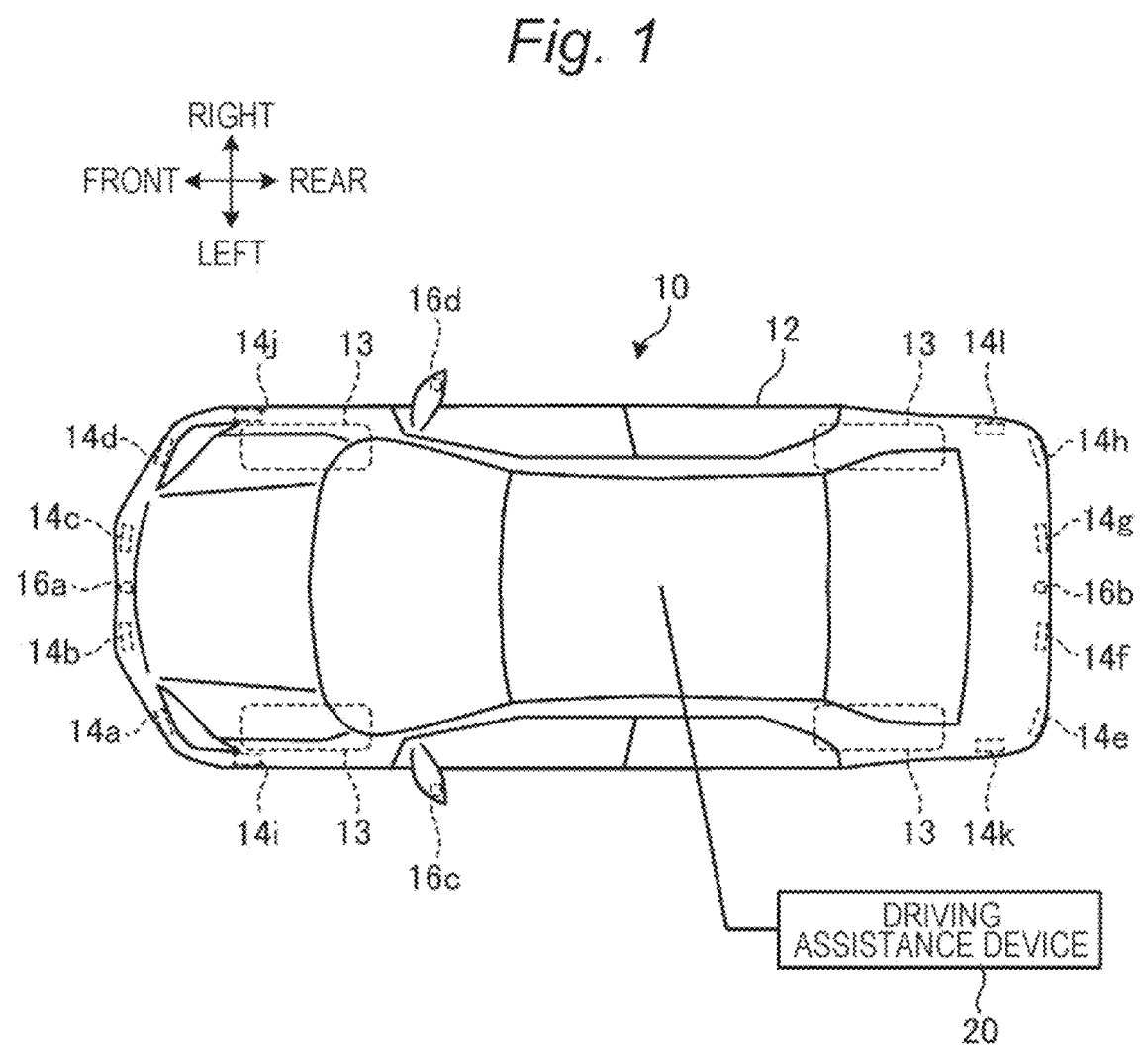

FIG. 1 is a top view of a vehicle 10 on which a driving assistance device 20 according to an embodiment is mounted. The front, rear, left, and right of the vehicle 10 in FIG. 1 indicate directions as viewed from a driver's seat of the vehicle 10.

The vehicle 10 of the embodiment may be, for example, an internal combustion engine car using an internal combustion engine as a drive source, an electric car, a fuel-cell car, or the like using an electric motor as a drive source, or a hybrid car using both of them as a drive source.

In addition, the vehicle 10 can be equipped with various shifting devices, and can be equipped with devices such as various systems and components necessary for driving the internal combustion engine or the electric motor. Moreover, the type, number, layout, and the like of devices related to the driving of a wheel 13 in the vehicle 10 can be variously set.

As illustrated in FIG. 1, the vehicle 10 includes a vehicle body 12, a plurality of wheels 13, a plurality of ranging units 14a to 14l, and a plurality of imaging units 16a to 16d. In a case where it is not necessary to distinguish the ranging units 14a to 14l, the ranging units are simply referred to as ranging unit 14. In addition, in a case where it is not necessary to distinguish the imaging units 16a to 16d, the imaging units are simply referred to as imaging unit 16. The ranging units 14a to 14l and the imaging units 16a to 16d are examples of a sensor that collects surrounding information of the vehicle 10.

The vehicle body 12 forms a vehicle interior in which an occupant rides. The plurality of wheels 13, the plurality of ranging units 14, and the plurality of imaging units 16 are attached to the vehicle body 12. In the example of FIG. 1, the vehicle body 12 includes four wheels 13, twelve ranging units 14, and four imaging units 16. However, the number of ranging units 14 and imaging units 16 attached to the vehicle body 12 may be any number.

The four wheels 13 are provided on the front, rear, left, and right of the vehicle body 12. The two front wheels 13 function as steered wheels, for example, and the two rear wheels 13 function as driven wheels, for example.

The ranging unit 14 is, for example, a sonar that is provided on the outer periphery of the vehicle 10 to transmit a sound wave such as an ultrasonic wave as a detection wave, and capture the detection wave reflected by an object such as an obstacle present around the vehicle 10. Note that the ranging unit 14 may be a radar that transmits a detection wave such as laser light, a millimeter wave radar, or the like.

The ranging unit 14 collects surrounding information indicating a situation around the vehicle 10, and outputs the surrounding information to the driving assistance device 20. For example, the ranging unit 14 collects a response time, which is a time from transmission to reception of a detection wave, as the surrounding information for specifying a distance between an object and the vehicle 10. The driving assistance device 20 can detect the presence or absence of an obstacle or the like around the vehicle 10 and a distance to the obstacle on the basis of the surrounding information collected by the ranging unit 14.

In a case where the ranging unit 14 receives a plurality of detection waves reflected by a plurality of points of an object in response to one transmission of a detection wave, only a response time of a detection wave received earliest may be included in the surrounding information.

The ranging units 14a to 14d are provided at the front of the vehicle body 12. Among these ranging units 14a to 14d, the ranging units 14b and 14c are also called front sonars, and are provided at the front end of the vehicle 10. The ranging units 14b and 14c detect an object in front of the vehicle 10 to collect surrounding information in front of the vehicle 10. In addition, the ranging units 14a and 14d are also called corner sonars, and are provided at corner portions of the front of the vehicle 10. The ranging units 14a and 14d detect an object on the front outer side of the vehicle 10 to collect surrounding information on the front outer side of the vehicle 10.

The ranging units 14e to 14h are provided at the rear of the vehicle body 12. Among these ranging units 14e to 14h, the ranging units 14f and 14g are also called rear sonars, and are provided at the rear end of the vehicle 10. The ranging units 14f and 14g detect an object behind the vehicle 10 to collect surrounding information behind the vehicle 10. In addition, the ranging units 14e and 14h are also called corner sonars, and are provided at corner portions of the rear of the vehicle 10. The ranging units 14e and 14h detect an object on the rear outer side of the vehicle 10 to collect surrounding information on the rear outer side of the vehicle 10.

The ranging units 14i to 14l are also called side sonars, and are provided on the lateral sides of the vehicle body 12. Among the ranging units 14i to 14l, the ranging units 14i and 14j are provided on the front lateral sides of the vehicle 10. The ranging units 14k and 14l are provided on the rear lateral sides of the vehicle 10. The ranging units 14i to 14l detect an object on the lateral sides of the vehicle 10 to collect surrounding information on the lateral sides of the vehicle 10.

The imaging unit 16 is, for example, a digital camera incorporating an imaging element such as a charge coupled device (CCD) or a CMOS image sensor (CIS). The imaging unit 16 generates a captured moving image including a plurality of frame images captured at a predetermined frame rate, or a captured still image.

The imaging unit 16 is provided on the outer periphery of the vehicle body 12. Each imaging unit 16 includes a wide-angle lens or a fish-eye lens, and can capture an image in a horizontal range of 140° to 190°, for example. The optical axis of the imaging unit 16 is set obliquely downward.

As a result, the imaging unit 16 collects the surrounding information obtained by imaging the surroundings of the vehicle 10 including a road surface, and outputs the surrounding information to the driving assistance device 20. The driving assistance device 20 can detect the presence or absence of an obstacle or the like around the vehicle 10 and the position of the obstacle on the basis of the surrounding information collected by the imaging unit 16. In addition, the driving assistance device 20 can detect a parking space around the vehicle 10 and the position of the parking space on the basis of the surrounding information collected by the imaging unit 16.

The imaging unit 16c is provided at a front-rear central portion of the left end of the vehicle body 12, for example, on a lower surface of a left side view mirror. The imaging unit 16c collects, as the surrounding information, a captured image obtained by imaging an area around the lower left of the vehicle 10. The imaging unit 16d is provided at a front-rear central portion of the right end of the vehicle body 12, for example, on a lower surface of a right side view mirror. The imaging unit 16d collects, as the surrounding information, a captured image obtained by imaging an area around the lower right of the vehicle 10.

The imaging unit 16a is provided at a left-right central portion of the front end of the vehicle body 12, for example, on a front bumper. The imaging unit 16a collects, as the surrounding information, a captured image obtained by imaging an area around the front of the vehicle 10. The imaging unit 16b is provided at a left-right central portion of the rear end of the vehicle body 12, for example, on a rear bumper. The imaging unit 16b collects, as the surrounding information, a captured image obtained by imaging an area around the rear of the vehicle 10.

(Configuration Example of Driving Assistance System)

FIG. 2 is a block diagram illustrating an example of an overall configuration of a driving assistance system 200 according to the embodiment. The driving assistance system 200 is mounted on, for example, the vehicle 10, and performs driving assistance such as parking in a parking space or unparking from the parking space of the vehicle 10.

As illustrated in FIG. 2, the driving assistance system 200 includes the driving assistance device 20, a monitor device 30, a braking system 40, an acceleration system 50, a steering system 60, a shifting system 70, a vehicle speed sensor 83, the ranging unit 14, and the imaging unit 16. These components are connected so as to be able to transmit and receive information to and from each other through an in-vehicle network NT.

The in-vehicle network NT includes, for example, a controller area network (CAN) and a local interconnect network (LIN). The in-vehicle network NT may be included in a part of the driving assistance system 200.

The driving assistance device 20 is configured as a microcomputer such as an electronic control unit (ECU), and performs driving assistance of the vehicle 10.

The driving assistance device 20 includes a central processing unit (CPU) 21, a display control circuit 23, a solid state drive (SSD) 24, a read only memory (ROM) 25, and a random access memory (RAM) 26. The CPU 21, the ROM 25, and the RAM 26 may be integrated in the same package.

The CPU 21 is an example of a hardware processor, reads a program stored in a nonvolatile storage device such as the ROM 25, and executes various computational processing and control according to the program.

The ROM 25 stores various programs, parameters necessary for executing the programs, and the like. The RAM 26 temporarily stores various data used in the computation by the CPU 21. The SSD 24 is a rewritable nonvolatile storage device, and maintains data when the driving assistance device 20 is powered off.

Among the computational processing performed by the driving assistance device 20, the display control circuit 23 mainly executes image processing of an image obtained by the imaging unit 16, data conversion of an image for display to be displayed on a display unit 31 (to be described later) included in the monitor device 30, and the like.

The braking system 40 includes a braking unit 41, a braking control unit 42, and a braking unit sensor 43, and controls deceleration of the vehicle 10.

The braking unit 41 is a device including, for example, a brake and a brake pedal, and decelerates the vehicle 10. The braking control unit 42 is, for example, a microcomputer including a hardware processor such as a CPU. The braking control unit 42 controls the braking unit 41 on the basis of an instruction from the driving assistance device 20 to control the deceleration of the vehicle 10. The braking unit sensor 43 is, for example, a position sensor, and detects the position of the brake pedal included in the braking unit 41. The braking unit sensor 43 outputs the detected brake pedal position to the in-vehicle network NT.

The acceleration system 50 includes an acceleration unit 51, an acceleration control unit 52, and an acceleration unit sensor 53, and controls acceleration of the vehicle 10.

The acceleration unit 51 is a device including, for example, an accelerator pedal, and accelerates the vehicle 10. The acceleration control unit 52 is, for example, a microcomputer including a hardware processor such as a CPU. The acceleration control unit 52 controls the acceleration unit 51 on the basis of an instruction from the driving assistance device 20 to control the acceleration of the vehicle 10. The acceleration unit sensor 53 is, for example, a position sensor, and detects the position of the accelerator pedal included in the acceleration unit 51. The acceleration unit sensor 53 outputs the detected accelerator pedal position to the in-vehicle network NT.

The steering system 60 includes a steering unit 61, a steering control unit 62, and a steering unit sensor 63, and controls a traveling direction of the vehicle 10.

The steering unit 61 is a device including, for example, a steering wheel, and steers the traveling direction of the vehicle 10 by turning the steered wheels of the vehicle 10. The steering control unit 62 is, for example, a microcomputer including a hardware processor such as a CPU. The steering control unit 62 controls the steering unit 61 on the basis of an instruction from the driving assistance device 20 to control the traveling direction of the vehicle 10. The steering unit sensor 63 is, for example, an angle sensor including a Hall element, and detects a steering angle that is a rotation angle of the steering unit 61. The steering unit sensor 63 outputs the detected steering angle of the steering unit 61 to the in-vehicle network NT.

The shifting system 70 includes a shifting unit 71, a shifting control unit 72, and a shifting unit sensor 73, and controls a shift ratio of the vehicle 10.

The shifting unit 71 is a device including, for example, a shift lever, and changes the shift ratio of the vehicle 10. The shifting control unit 72 is, for example, a microcomputer including a hardware processor such as a CPU. The shifting control unit 72 controls the shifting unit 71 on the basis of an instruction from the driving assistance device 20 to control the shift ratio of the vehicle 10. The shifting unit sensor 73 is, for example, a position sensor, and detects the position of the shift lever included in the shifting unit 71. The shifting unit sensor 73 outputs the detected shift lever position to the in-vehicle network NT.

The vehicle speed sensor 83 includes, for example, a Hall element provided in the vicinity of the wheel 13 of the vehicle 10, and detects a rotation amount or a rotation speed per unit time of the wheel 13. The vehicle speed sensor 83 outputs a wheel speed pulse number indicating the detected rotation amount or rotation speed to the in-vehicle network NT, as a sensor value for calculating the speed (vehicle speed) of the vehicle 10. The driving assistance device 20 can calculate the speed, movement amount, and the like of the vehicle 10 on the basis of the sensor value acquired from the vehicle speed sensor 83.

The monitor device 30 is provided on a dashboard or the like in the vehicle interior of the vehicle 10, and includes the display unit 31 and an input unit 32.

The display unit 31 is a display device such as a liquid crystal display (LCD) or an organic electroluminescent display (OELD). The display unit 31 displays, for example, an image based on image data transmitted from the driving assistance device 20 and an image for receiving an operation instruction ordering switching between automatic driving and manual driving.

The input unit 32 is, for example, a touch panel provided on a display screen of the display unit 31. The input unit 32 is configured to allow transmission of contents displayed on the display screen by the display unit 31. As a result, the input unit 32 allows an occupant to visually recognize the display contents of the display unit 31.

The input unit 32 receives an instruction input by the occupant touching a position corresponding to the display contents of the display unit 31, and transmits the instruction to the driving assistance device 20 through the in-vehicle network NT. Note that the input unit 32 is not limited to the touch panel, and may be a push-button-type hard switch or the like.

Figure 3:
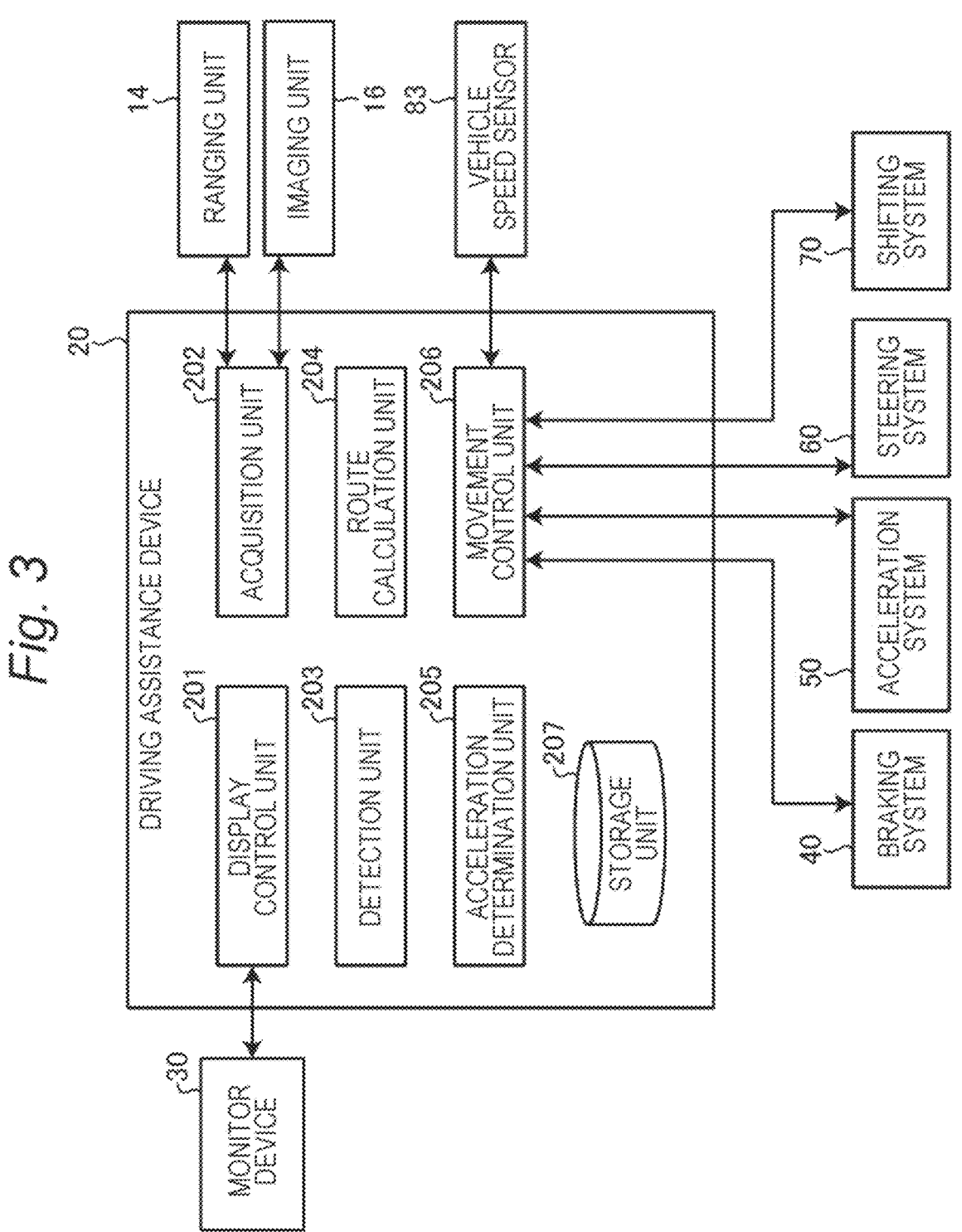
FIG. 3 is a block diagram illustrating an example of a functional configuration of the driving assistance device according to the embodiment.

FIG. 3 is a block diagram illustrating an example of a functional configuration of the driving assistance device 20 according to the embodiment. As illustrated in FIG. 3, the driving assistance device 20 includes a display control unit 201, an acquisition unit 202, a detection unit 203, a route calculation unit 204, an acceleration determination unit 205, a movement control unit 206, and a storage unit 207 as functional units.

These functional units are realized, for example, by the above-described CPU 21 reading a program stored in a storage device such as the ROM 25 and executing the program. Alternatively, these functional units are realized by the display control circuit 23, the SSD 24, the ROM 25, the RAM 26, and the like being operated under the control of the CPU 21 according to the program.

Note that some or all of these functional units may be configured by hardware such as a circuit including an application specific integrated circuit (ASIC).

The display control unit 201 generates contents to be displayed on the display unit 31 of the monitor device 30 and causes the display unit 31 to display the contents. That is, the display control unit 201 causes the display unit 31 to display, for example, a notification screen indicating that a parking space in which the vehicle 10 can be parked has been detected, a selection screen for starting, suspending, or canceling driving assistance, or a surrounding image of the vehicle 10 during driving assistance.

The acquisition unit 202 acquires, as the surrounding information of the vehicle 10, transmission/reception information of a sound wave from the ranging unit 14 and a captured image of the surroundings of the vehicle 10 from the imaging unit 16.

The detection unit 203 detects an obstacle, a parking section, a parking space, and the like around the vehicle 10 on the basis of the surrounding information acquired by the acquisition unit 202.

The obstacle is, for example, various objects such as another vehicle, a wall, a pillar, a fence, a protrusion, a step, and a wheel stopper. The obstacle may also be, for example, a person or the like walking in a parking lot.

The parking section is provided for parking of the vehicle 10, and is an area partitioned by, for example, a partition line, a frame line, a straight line, a band, or a step. The parking space is a parking section where the vehicle 10 can be parked, that is, a parking section where there is no obstacle, such as another vehicle, to parking of the vehicle 10. The partition line, the frame line, the straight line, the band, the step, or the like described above is an example of an object indicating the parking space, and becomes a target used when the driving assistance device 20 causes the vehicle 10 to enter or exit from the parking space in assisting the vehicle 10 to enter or exit from the parking space.

Upon receiving an instruction to start driving assistance from a driver or the like of the vehicle 10, the detection unit 203 detects the presence or absence of an obstacle, a distance from the vehicle 10 to the obstacle, and the like on the basis of a detection result of the ranging unit 14, for example. In addition, the detection unit 203 detects the presence or absence of an obstacle, a parking section, the positions (orientations) of the obstacle and the parking section with respect to the vehicle 10, and the shapes, sizes, heights, and the like of the obstacle and the parking section by image processing based on an image captured by the imaging unit 16, for example.

By combining these detection results, the detection unit 203 extracts information on whether or not there is an obstacle around the vehicle 10, whether or not the obstacle can hinder the traveling of the vehicle 10, whether or not there is a parking section around the vehicle 10, whether or not it is possible to park the vehicle 10 in the parking section, that is, whether or not the parking section can be used as a parking space, or the like.

The route calculation unit 204 calculates a target position to which the vehicle 10 is to be guided on the basis of the detection result by the detection unit 203, and calculates a movement route along which the vehicle 10 is to be moved to the target position.

In the case of parking the vehicle 10, a parking space detected by the detection unit 203 is the target position. In the case of unparking the vehicle 10, a predetermined place from which the vehicle 10 can safely start traveling, such as a path provided between a plurality of parking sections, is the target position.

In addition, the route calculation unit 204 may calculate a steering wheel turn-back position as necessary. In a case where it is difficult to park or unpark the vehicle 10 only by one backward movement or forward movement, one or more steering wheel turn-back positions are set.

The route calculation unit 204 calculates the movement route of the vehicle 10 from the current position of the vehicle 10 to the target position calculated as described above in order to guide the vehicle 10 to the target position. The movement route may include the steering wheel turn-back position as described above. In this case, the route calculation unit 204 calculates the movement route from the current position of the vehicle 10 to the target position through the steering wheel turn-back position.

In this manner, the route calculation unit 204 calculates the movement route for parking, such as backward parking or forward parking. In addition, the route calculation unit 204 calculates the movement route for unparking, such as forward unparking or backward unparking.

The movement control unit 206 controls each unit of the vehicle 10 to move the vehicle 10 during driving assistance of the vehicle 10. Specifically, the movement control unit 206 controls all or some of the braking system 40, the acceleration system 50, the steering system 60, and the shifting system 70 to move the vehicle 10 to the target position according to the above movement route. At this time, the movement control unit 206 moves the vehicle 10 while receiving feedback from the respective sensors such as the braking unit sensor 43, the acceleration unit sensor 53, the steering unit sensor 63, the shifting unit sensor 73, and the vehicle speed sensor 83.

In addition, in the driving assistance device 20, an appropriate speed limit value is set in advance according to a current situation of the vehicle 10 under driving assistance. More specifically, the speed limit value is a speed value with which the vehicle 10 can be safely moved under a current situation depending on, for example, whether the vehicle 10 is currently located inside or outside a parking space, whether the vehicle 10 is moving forward or backward, and whether there is an obstacle within a predetermined range from the vehicle 10. For example, the storage unit 207 stores the settings of the speed limit value.

The movement control unit 206 refers to the data in the storage unit 207, selects the speed limit value according to the current situation of the vehicle 10, and moves the vehicle 10 within the speed limit value. At this time, the movement control unit 206 may move the vehicle 10 only at a speed equal to the speed limit value. In this case, it can be said that the speed limit value is also a target speed of the vehicle 10.

As described above, by moving the vehicle 10 at a speed as high as possible within the current speed limit value, it is possible to complete parking and unparking of the vehicle 10 in a short time while ensuring safe traveling of the vehicle 10.

Note that the detection unit 203 continues acquiring the surrounding information from the ranging unit 14 and the imaging unit 16 even after the movement control unit 206 starts moving the vehicle 10. The above-described route calculation unit 204 recalculates the movement route as appropriate on the basis of the detection result by the detection unit 203. After the movement route is recalculated, the movement control unit 206 continues moving the vehicle 10 so as to finely adjust the position of the vehicle 10 accordingly.

The acceleration determination unit 205 determines acceleration of the vehicle 10 as appropriate on the basis of a predetermined acceleration time and the speed limit value currently selected by the movement control unit 206. The acceleration time is set, for example, for each of forward movement and backward movement of the vehicle 10, and these settings are stored, for example, in the storage unit 207. The acceleration time at the time of forward movement of the vehicle 10 is an example of a first acceleration time. The acceleration time at the time of backward movement of the vehicle 10 is an example of a second acceleration time.

After selecting the speed limit value according to the current situation of the vehicle 10, the above-described movement control unit 206 accelerates the vehicle 10 at the acceleration determined by the acceleration determination unit 205 and controls the vehicle 10 so that the speed of the vehicle 10 becomes the selected speed limit value.

The storage unit 207 stores, for example, a program executed by the CPU 21 of the driving assistance device 20, and various control parameters necessary for the operation of the driving assistance device 20. In addition, as described above, the storage unit 207 stores the settings of the speed limit value according to the current situation of the vehicle 10, the acceleration time at the time of forward movement and the acceleration time at the time of backward movement, and the like.

(Determination Example of Acceleration Time)

Next, an example of the acceleration time determined by the driving assistance device 20 of the embodiment will be described with reference to FIGS. 4 and 5.

Figure 4:
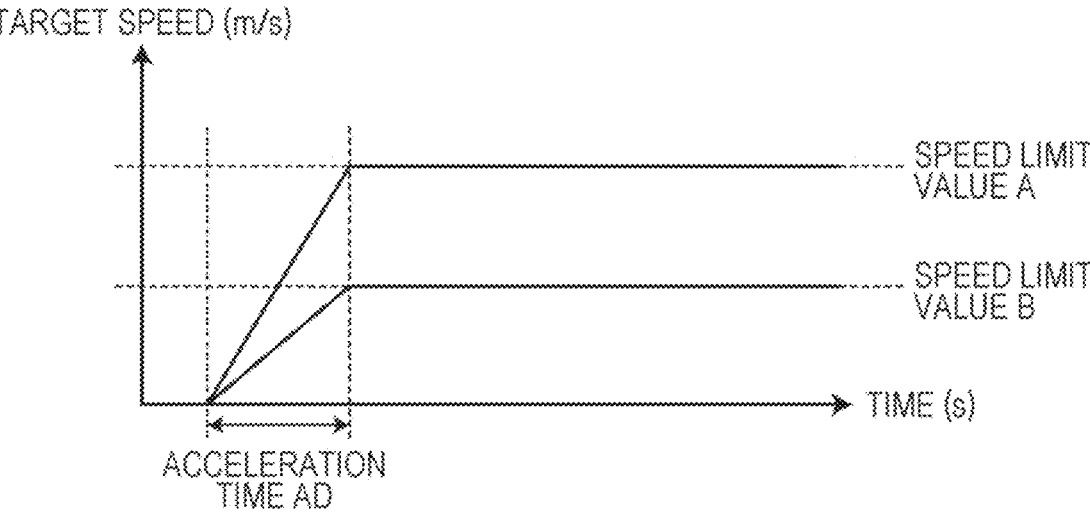
FIG. 4 is a graph illustrating an example of an acceleration time at the time of forward movement of the vehicle determined by the driving assistance device according to the embodiment.

FIG. 4 is a graph illustrating an example of an acceleration time AD at the time of forward movement of the vehicle 10 determined by the driving assistance device 20 according to the embodiment. FIG. 5 is a graph illustrating an example of an acceleration time RT at the time of backward movement of the vehicle 10 determined by the driving assistance device 20 according to the embodiment.

Figure 5:
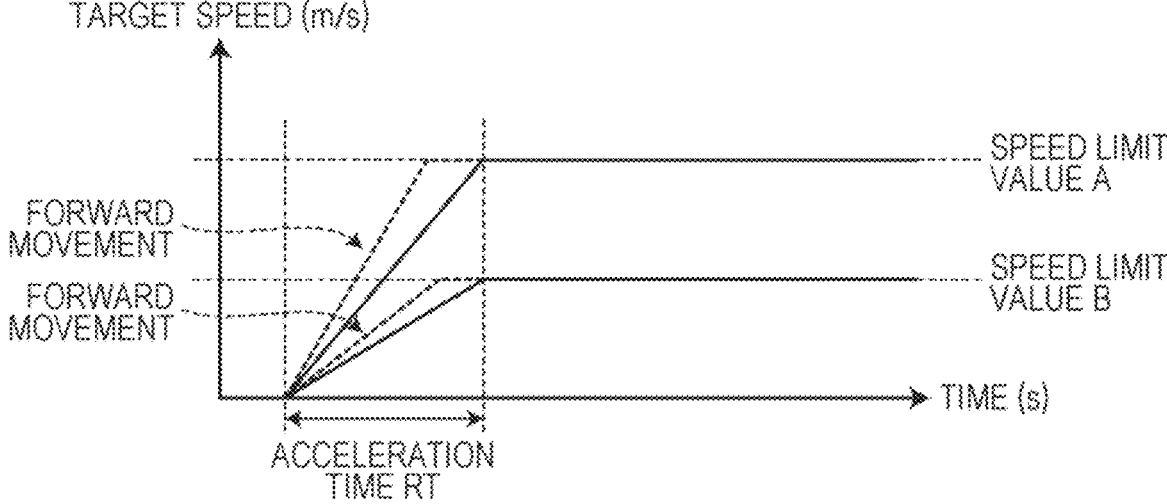
FIG. 5 is a graph illustrating an example of an acceleration time at the time of backward movement of the vehicle determined by the driving assistance device according to the embodiment.

In the graphs of FIGS. 4 and 5, the horizontal axis represents time(s), and the vertical axis represents target speed (m/s).

As illustrated in FIGS. 4 and 5, for example, when performing movement control of the vehicle 10, the driving assistance device 20 of the embodiment controls the vehicle 10 to reach a target speed within the predetermined acceleration time AD or acceleration time RT determined in advance. That is, in either case where a speed limit value A is set as the target speed or a speed limit value B lower than the speed limit value A is set as the target speed, the vehicle 10 is controlled to reach each target speed within the acceleration time AD or the acceleration time RT fixed to be constant according to the traveling direction of the vehicle 10 such as forward movement or backward movement.

Therefore, when the speed limit value B lower than the speed limit value A is set as the target speed, the acceleration of the vehicle 10 becomes smaller than when the speed limit value A is set as the target speed.

Among these acceleration times AD and RT, the acceleration determination unit 205 sets the acceleration time AD in a case where the movement control unit 206 is to move the vehicle 10 forward. The acceleration determination unit 205 sets the acceleration time RT in a case where the movement control unit 206 is to move the vehicle 10 backward.

In addition, the acceleration time RT at the time of backward movement of the vehicle 10 is set to be longer than the acceleration time AD at the time of forward movement of the vehicle 10. Therefore, when the target speed is the same, the acceleration of the vehicle 10 at the time of backward movement indicated by the solid line in FIG. 5 is smaller than the acceleration at the time of forward movement indicated by the broken line in FIG. 5.

(Operation Example of Driving Assistance Device)

Next, an operation example of the driving assistance device 20 of the embodiment will be described with reference to FIGS. 6 to 8.

Figure 6:
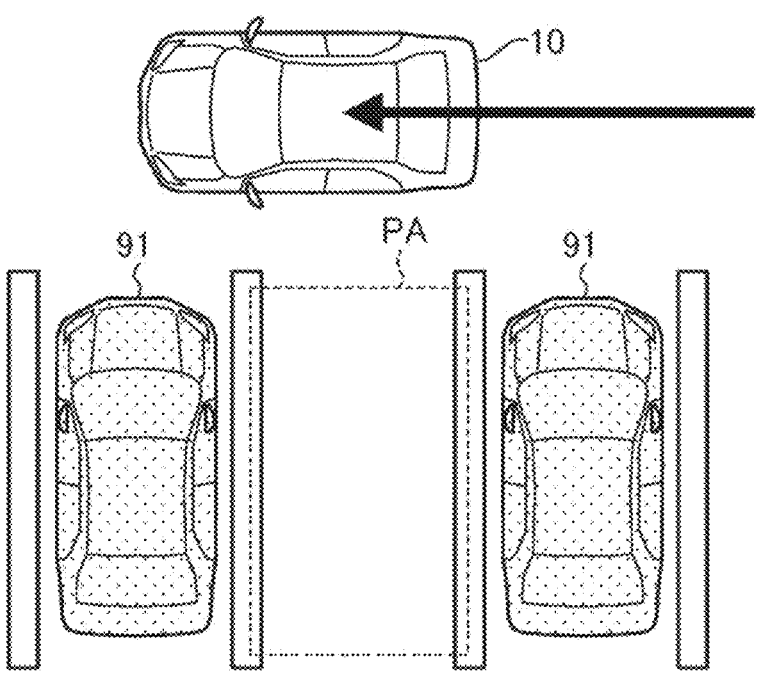
FIG. 6 is a schematic view illustrating an example of a driving assistance operation by the driving assistance device according to the embodiment.
Figure 7:
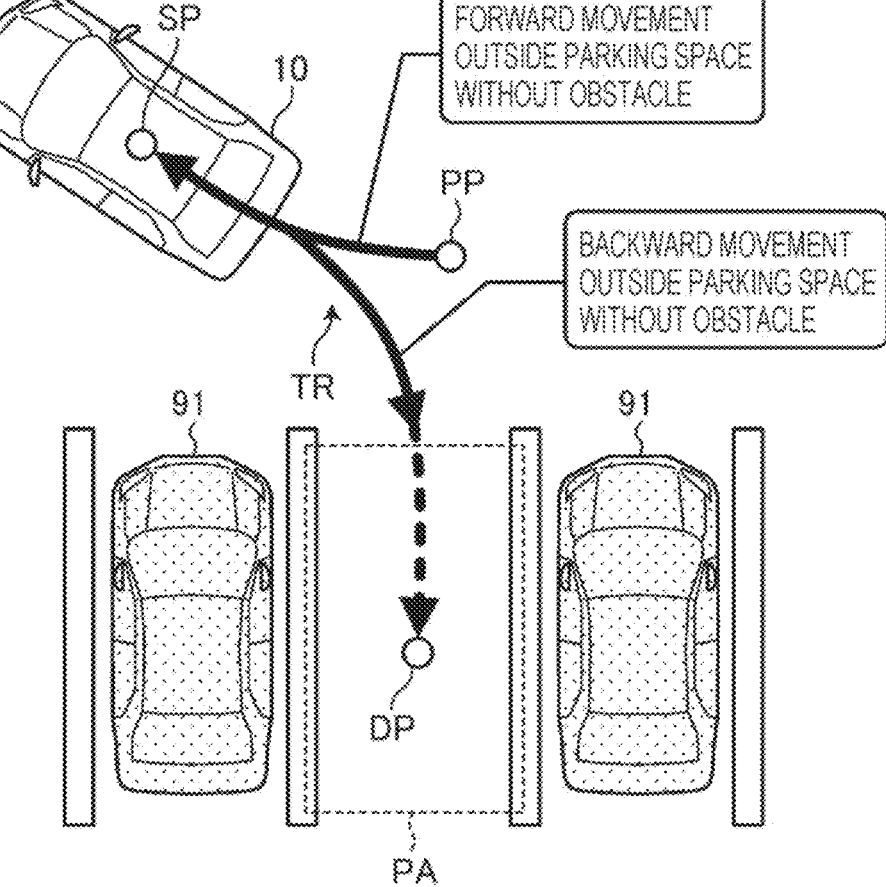
FIG. 7 is a schematic view illustrating an example of the driving assistance operation by the driving assistance device according to the embodiment.
Figure 8:
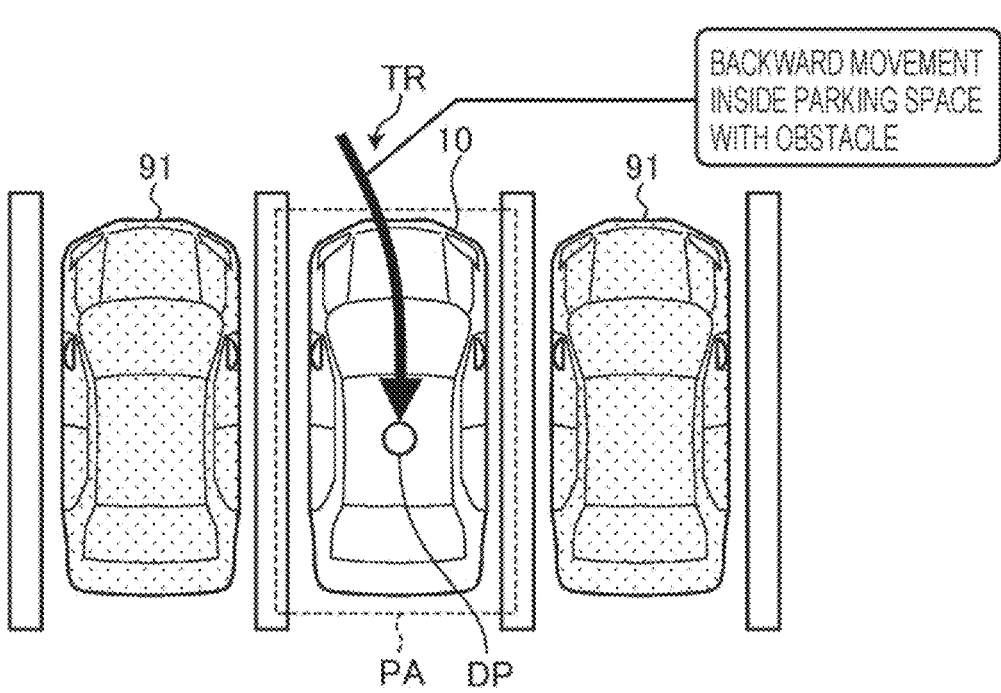
FIG. 8 is a schematic view illustrating an example of the driving assistance operation by the driving assistance device according to the embodiment.

FIGS. 6 to 8 are schematic views illustrating examples of a driving assistance operation by the driving assistance device 20 according to the embodiment. In FIGS. 6 to 8, an example in which the vehicle 10 is parked backward will be described.

As illustrated in FIG. 6, in a parking lot or the like in which a plurality of parking sections are arranged, one parking section is assumed to be vacant while being sandwiched between parking sections in which other vehicles 91 are parked.

When the vehicle 10 is stopped at a predetermined position, for example, near the vacant parking section, the detection unit 203 of the driving assistance device 20 mounted on the vehicle 10 detects, for example, this vacant parking section from the plurality of parking sections as a parking space PA where the vehicle 10 can be parked. The display control unit 201 of the driving assistance device 20 causes the display unit 31 of the monitor device 30 to display the detected parking space PA.

When desiring to park the vehicle 10 in the parking space PA, a driver or the like of the vehicle 10 can instruct the driving assistance device 20 to execute driving assistance using the input unit 32 (see FIG. 2) of the monitor device 30 or the like. As a result, the driving assistance device 20 starts parking assistance of the vehicle 10.

As illustrated in FIG. 7, the route calculation unit 204 of the driving assistance device 20 calculates a movement route TR. For example, the movement route TR passes from a stop position PP of the vehicle 10 stopped near the parking space PA through a steering wheel turn-back position SP in a forward movement direction of the vehicle 10 to a target position DP located in the parking space PA in a backward movement direction of the vehicle 10 from the steering wheel turn-back position SP.

The movement control unit 206 of the driving assistance device 20 starts moving the vehicle 10 along the movement route TR according to the calculation result of the route calculation unit 204.

Initially, the movement control unit 206 moves the vehicle 10 forward from the stop position PP toward the steering wheel turn-back position SP. At this time, the movement control unit 206 selects the speed limit value corresponding to the current situation of the vehicle 10.

In the example of FIG. 7, at this point of time, the vehicle 10 is outside the parking space PA, and the movement control unit 206 is to move the vehicle 10 forward. In addition, it is assumed that there is no obstacle within a predetermined range around the vehicle 10. The movement control unit 206 selects the speed limit value corresponding to such a situation of the vehicle 10.

The acceleration determination unit 205 calculates the acceleration at which the vehicle 10 reaches the speed of the speed limit value selected by the movement control unit 206 within the acceleration time at the time of forward movement on the basis of the speed limit value selected by the movement control unit 206 and the acceleration time at the time of forward movement stored in advance in the storage unit 207. Such acceleration is calculated by, for example, Equation (1) described below.

$$\text{Acceleration } (m/s^2) = \text{speed limit value } (m/s)/\text{acceleration time } (s) \tag{1}$$

For example, with the selected speed limit value as the target speed, the movement control unit 206 moves the vehicle 10 forward at the acceleration determined by the acceleration determination unit 205, and moves the vehicle 10 from the stop position PP to the steering wheel turn-back position SP while maintaining the speed of the vehicle 10 within the speed limit value.

Next, the movement control unit 206 moves the vehicle 10 backward from the steering wheel turn-back position SP toward the target position DP. At this time, the movement control unit 206 selects the speed limit value corresponding to the current situation of the vehicle 10.

In the movement route TR indicated by the solid line in FIG. 7 along the movement route TR from the steering wheel turn-back position SP to the target position DP, the vehicle 10 is still outside the parking space PA, and the movement control unit 206 is to move the vehicle 10 backward. In addition, it is assumed that there is no obstacle within a predetermined range around the vehicle 10. The movement control unit 206 selects the speed limit value corresponding to such a situation of the vehicle 10.

The acceleration determination unit 205 calculates the acceleration at which the vehicle 10 reaches the speed of the speed limit value selected by the movement control unit 206 within the acceleration time at the time of backward movement, for example, according to Equation (1) described above on the basis of the speed limit value selected by the movement control unit 206 and the acceleration time at the time of backward movement stored in advance in the storage unit 207.

For example, with the selected speed limit value as the target speed, the movement control unit 206 moves the vehicle 10 backward at the acceleration determined by the acceleration determination unit 205, and moves the vehicle 10 from the steering wheel turn-back position SP to the target position DP while maintaining the speed of the vehicle 10 within the speed limit value.

As illustrated in FIG. 8, the movement control unit 206 is still moving the vehicle 10 backward toward the target position DP. At this time, the movement control unit 206 selects the speed limit value corresponding to the current situation of the vehicle 10.

In the example of FIG. 8, the vehicle 10 has entered the parking space PA, and the movement control unit 206 is to further move the vehicle 10 backward. In addition, it is assumed that an obstacle such as another vehicle 91 exists within a predetermined range around the vehicle 10. The movement control unit 206 selects the speed limit value corresponding to such a situation of the vehicle 10.

The acceleration determination unit 205 calculates the acceleration at which the vehicle 10 reaches the speed of the speed limit value selected by the movement control unit 206 within the acceleration time at the time of backward movement, for example, according to Equation (1) described above on the basis of the speed limit value selected by the movement control unit 206 and the acceleration time at the time of backward movement stored in advance in the storage unit 207.

For example, with the selected speed limit value as the target speed, the movement control unit 206 moves the vehicle 10 backward at the acceleration determined by the acceleration determination unit 205, and moves the vehicle 10 to the target position DP while maintaining the speed of the vehicle 10 within the speed limit value.

Under the control of the driving assistance device 20 as described above, the vehicle 10 is parked at the target position DP in the parking space PA, and the parking assistance by the driving assistance device 20 is completed.

As described above, in the examples of FIGS. 6 to 8, the selection of the speed limit value and the acceleration time and the calculation of the acceleration are performed three times in total on the movement route TR. However, the above description is merely for convenience, and the current situation of the vehicle 10 can change from time to time on the movement route TR. Therefore, in actual control, the movement control unit 206 and the acceleration determination unit 205 may repeat the above processing at short time intervals on the order of microseconds, for example.

In addition, in FIGS. 6 to 8, an example in which the vehicle 10 is parked backward in a perpendicular parking lot has been described. However, the driving assistance device 20 similarly controls the vehicle 10 not only in the case of perpendicular backward parking but also in the case of perpendicular forward parking, perpendicular forward/backward unparking, parallel parking/unparking, or the like.

(Processing Example of Driving Assistance Device)

Figure 9:
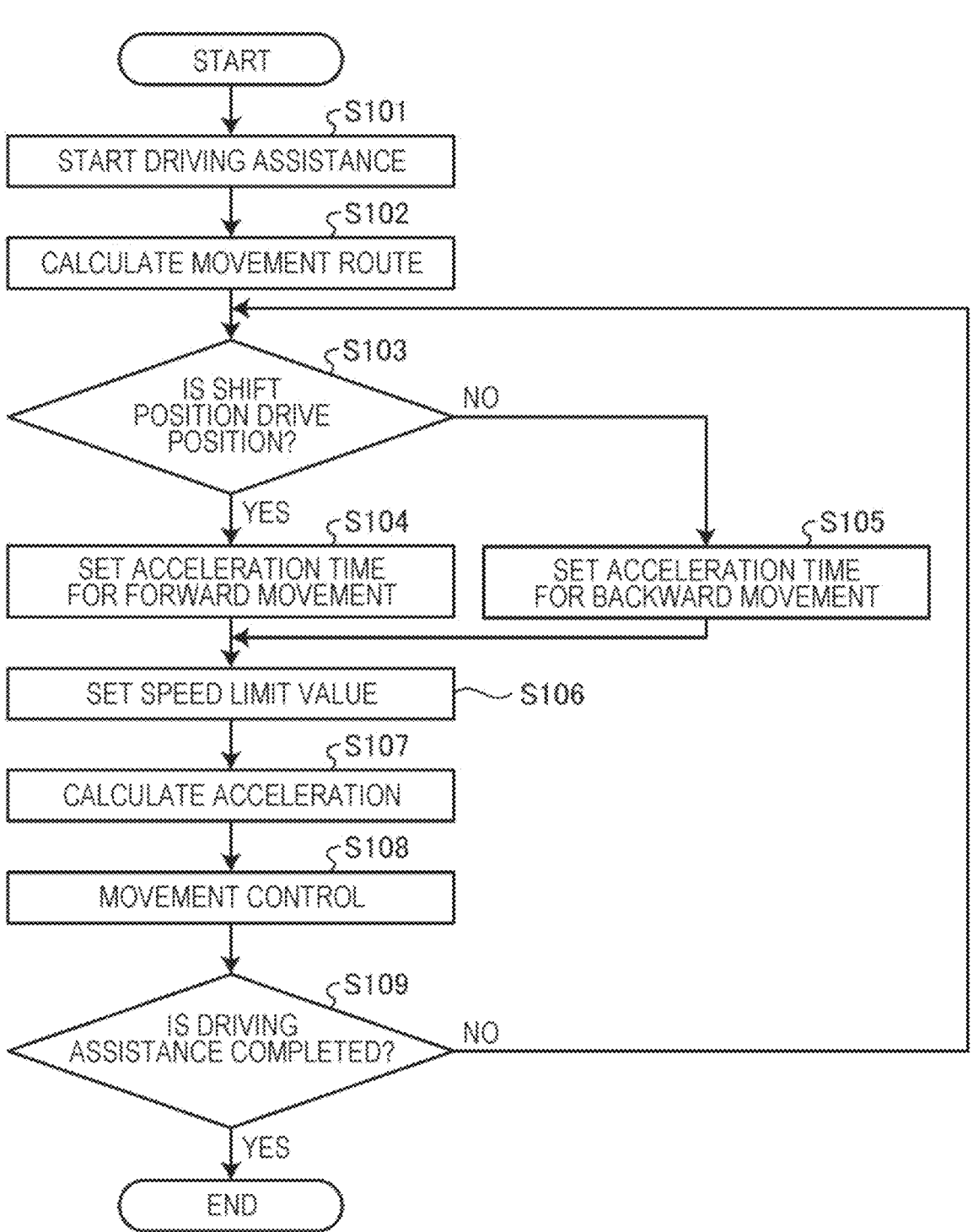
FIG. 9 is a flowchart illustrating a procedure example of a driving assistance process by the driving assistance device according to the embodiment.

Next, an example of a driving assistance process by the driving assistance device 20 of the embodiment will be described with reference to FIG. 9. FIG. 9 is a flowchart illustrating a procedure example of the driving assistance process by the driving assistance device 20 according to the embodiment.

As illustrated in FIG. 9, when an instruction to start driving assistance is received from a driver or the like of the vehicle 10, the driving assistance device 20 starts control (step S101). The route calculation unit 204 calculates the movement route from the stop position to the target position of the vehicle 10 at the point of time (step S102).

The acceleration determination unit 205 refers to the detection result or the like of the shifting unit sensor 73 (see FIG. 2) included in the shifting system 70, and determines whether or not the shift lever position of the vehicle 10 at the point of time is a drive position (step S103). In a case where the shift lever position is the drive position (step S103: Yes), the acceleration determination unit 205 sets the acceleration time for forward movement (step S104). In a case where the shift lever position is a position other than the drive position such as a reverse position (step S103: No), the acceleration determination unit 205 sets the acceleration time for backward movement (step S105).

On the other hand, the movement control unit 206 sets the speed limit value according to the situation of the vehicle 10 at the point of time (step S106). The acceleration determination unit 205 calculates the acceleration at which the speed of the vehicle 10 reaches the speed limit value on the basis of the acceleration time set in the processing of step S104 or step S105 and the speed limit value set by the movement control unit 206 in the processing of step S106 (step S107).

The acceleration determination unit 205 accelerates the vehicle 10 at the acceleration calculated by the acceleration determination unit 205 in the processing of step S107 using, for example, the speed limit value set in the processing of step S106 as the target speed, and performs the movement control of the vehicle 10 (step S108).

The movement control unit 206 determines whether or not the driving assistance process is completed with the vehicle 10 reaching the target position or the like (step S109). When the driving assistance process is continuing (step S109: No), the processing from step S103 is repeated until the driving assistance process is completed (step S109: Yes).

The driving assistance process by the driving assistance device 20 of the embodiment ends in this manner.

(Overview)

The driving assistance device performs the driving assistance of the vehicle on the basis of the vehicle surrounding information from various sensors such as the ranging unit and the imaging unit. However, an occupant of the vehicle including a driver may feel uncomfortable under a predetermined situation during the driving assistance. This point will be described with reference to FIG. 10.

Figure 10:
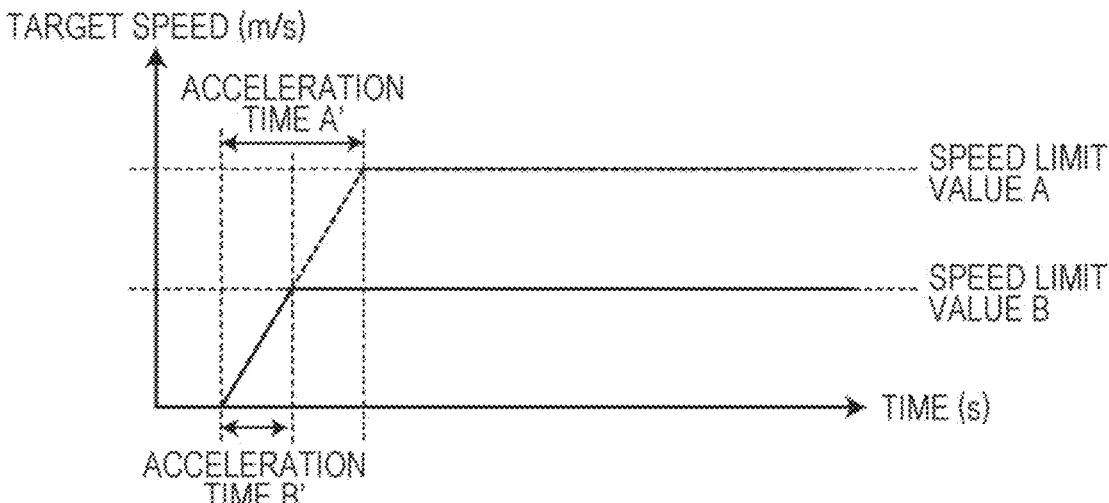
FIG. 10 is a graph illustrating an example of an acceleration time determined by a driving assistance device according to a comparative example.

FIG. 10 is a graph illustrating an example of an acceleration time determined by a driving assistance device according to a comparative example. In the graph of FIG. 10, the horizontal axis represents time(s), and the vertical axis represents target speed (m/s).

As illustrated in FIG. 10, the driving assistance device of the comparative example accelerates the vehicle within a predetermined acceleration range, for example, at the same acceleration, regardless of which of the speed limit value A and the speed limit value B lower than the speed limit value A is the target speed of the vehicle, and causes the speed of the vehicle to reach either the speed limit value A or B.

Therefore, when the speed limit value B lower than speed limit value A is set as the target speed, the speed reaches the target speed faster than when the speed limit value A is set as the target speed. That is, an acceleration time B' required to reach the speed limit value B is shorter than an acceleration time A' required to reach the speed limit value A.

In addition, the above control by the driving assistance device of the comparative example does not change between the forward movement and the backward movement of the vehicle. That is, the acceleration time A' required to reach the speed limit value A can be the same time between the forward movement and the backward movement of the vehicle, and the acceleration time B' required to reach the speed limit value B can be the same time between the forward movement and the backward movement of the vehicle.

Here, for example, when the speed limit value is low and the acceleration time is short, the occupant is given an impression as if the vehicle suddenly starts, and the occupant may feel uncomfortable. When the vehicle moves backward, such an impression tends to be further strengthened.

According to the driving assistance device 20 of the embodiment, the acceleration at which the vehicle 10 reaches the target speed is determined on the basis of the predetermined acceleration time and the speed limit value selected by the movement control unit 206.

As described above, since the acceleration time is determined in advance regardless of the speed limit value, it is possible to improve the ride comfort of the occupant even in a case where the speed limit value is low, for example. In addition, since the acceleration time is determined in advance, it is possible to reduce unnecessary time spent on parking or unparking while improving the ride comfort of the occupant, and to quickly end the process.

According to the driving assistance device 20 of the embodiment, the acceleration time for forward movement is used in a case where the vehicle 10 is moved forward, and the acceleration time for backward movement is used in a case where the vehicle 10 is moved backward. In this manner, the different acceleration times are set between the forward movement and the backward movement of the vehicle 10 in which the occupant feels different even at the same acceleration, so that finer control can be performed.

According to the driving assistance device 20 of the embodiment, the acceleration time at the time of backward movement of the vehicle 10 is set to be longer than the acceleration time at the time of forward movement. This makes it possible to improve the ride comfort of the occupant even at the time of backward movement of the vehicle 10 that tends to give the occupant a stronger impression that the vehicle 10 has suddenly accelerated.

According to the driving assistance device 20 of the embodiment, the acceleration time at the time of forward movement and the acceleration time at the time of backward movement are fixed times. In this manner, the acceleration time is set exclusively for the forward movement and the backward movement, which makes it possible to inhibit the control from becoming complicated by setting a large number of acceleration times or the like.

In the above embodiment, the driving assistance device 20 is mounted on the vehicle 10. However, the driving assistance device 20 does not necessarily have to be mounted on the vehicle 10. For example, the driving assistance device may acquire the surrounding information of the vehicle from various sensors at a position away from the vehicle, and perform the driving assistance of the vehicle by remote control.

A driving assistance device performs driving assistance of a vehicle on a basis of surrounding information collected by a plurality of sensors provided in the vehicle. The driving assistance device includes: a route calculation unit configured to calculate a movement route of the vehicle to a target position on a basis of the surrounding information from the plurality of sensors; a movement control unit configured to move the vehicle along the movement route at a target speed within a speed limit value according to a current situation of the vehicle; and an acceleration determination unit configured to determine acceleration at which the vehicle reaches the target speed on a basis of a predetermined acceleration time and the speed limit value.

The driving assistance device of the embodiment can improve ride comfort of an occupant of a vehicle during execution of driving assistance.

In the driving assistance device, the acceleration determination unit uses a first acceleration time to move the vehicle forward, and uses a second acceleration time to move the vehicle backward.

In the driving assistance device, the second acceleration time is set to a time longer than the first acceleration time.

In the driving assistance device, each of the first and second acceleration times is a fixed time.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A driving assistance device that performs driving assistance of a vehicle on a basis of surrounding information collected by a plurality of sensors provided in the vehicle, the driving assistance device comprising:

a route calculation unit configured to calculate a movement route of the vehicle to a target position on a basis of the surrounding information from the plurality of sensors;

a movement control unit configured to move the vehicle along the movement route at a target speed within a speed limit value according to a current situation of the vehicle; and an acceleration determination unit configured to determine a constant acceleration at which the vehicle reaches the target speed on a basis of a predetermined acceleration time and the speed limit value.

2. The driving assistance device according to claim 1, wherein the acceleration determination unit uses a first acceleration time to move the vehicle forward, and uses a second acceleration time to move the vehicle backward.

3. The driving assistance device according to claim 2, wherein the second acceleration time is set to a time longer than the first acceleration time.

4. The driving assistance device according to claim 2, wherein each of the first and second acceleration times is a fixed time.

5. The driving assistance device according to claim 3, wherein each of the first and second acceleration times is a fixed time.

6. The driving assistance device according to claim 1, wherein initial movement of the vehicle begins at the constant acceleration.

\* \* \* \* \*